T. W. WILLIAMS.
ATTACHMENT FOR CORN POPPING MACHINES.
APPLICATION FILED DEC. 21, 1916.

1,360,606.

Patented Nov. 30, 1920.
2 SHEETS—SHEET 1.

T. W. Williams.
Inventor

By Geo. P. Kimmel
Attorney

T. W. WILLIAMS.
ATTACHMENT FOR CORN POPPING MACHINES.
APPLICATION FILED DEC. 21, 1916.
1,360,606.
Patented Nov. 30, 1920.
2 SHEETS—SHEET 2.
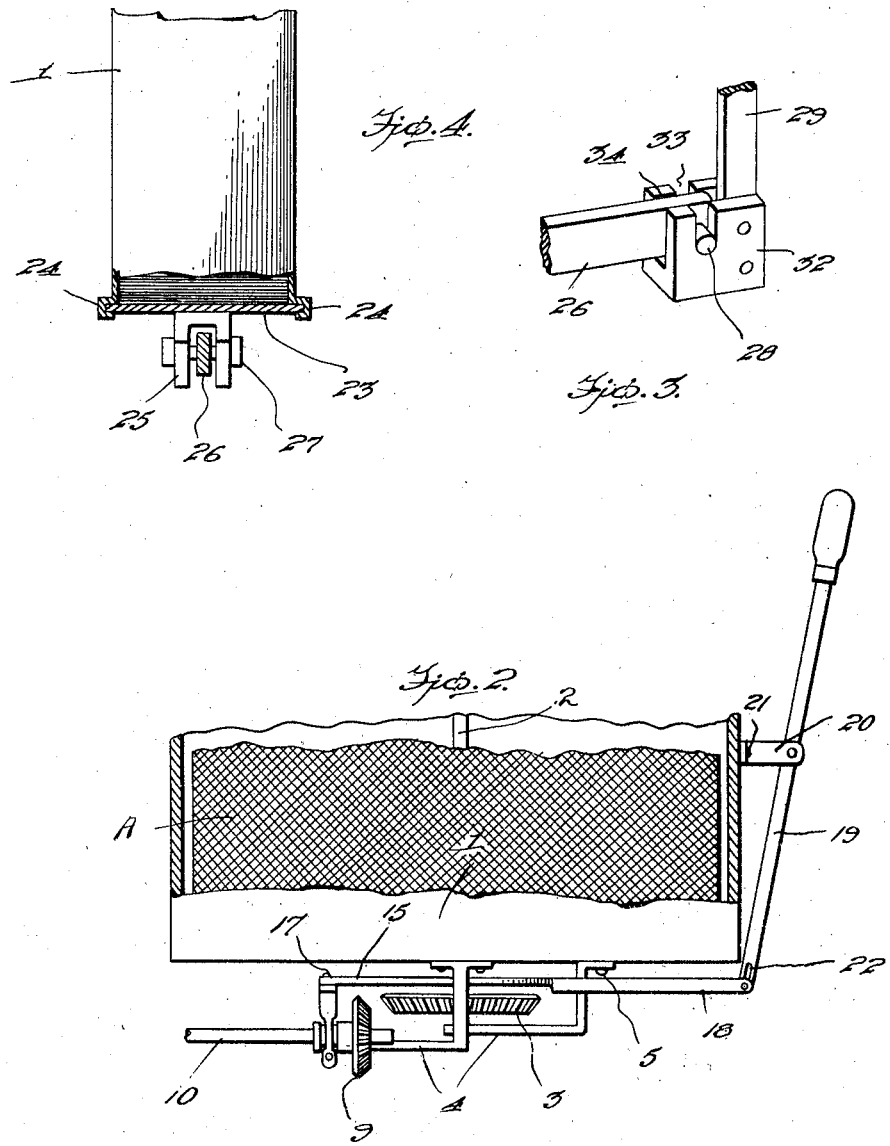

UNITED STATES PATENT OFFICE.

THOMAS W. WILLIAMS, OF CHARLESTON, ILLINOIS.

ATTACHMENT FOR CORN-POPPING MACHINES.

1,360,606. Specification of Letters Patent. Patented Nov. 30, 1920.

Application filed December 21, 1916. Serial No. 138,208.

*To all whom it may concern:*

Be it known that I, THOMAS W. WILLIAMS, a citizen of the United States, and resident of Charleston, in the county of Coles and State of Illinois, have invented certain new and useful Improvements in Attachments for Corn-Popping Machines, of which the following is a specification.

This invention relates to corn popping apparatus, and has more especial reference to an improved dumping attachment therefor.

The primary object of the invention is the provision of an attachment of this character, wherein on rendering the driving mechanism for the corn popping cylinder inactive, the hopper end of the casing therefor is automatically opened to permit the unpopped corn which drops from said cylinder to be discharged from the casing, thereby eliminating any possibility of conflagration resultant from the firing of the unpopped corn if confined within said casing as is usual in corn popping machines.

Another object of the invention is the provision of an attachment of this character, wherein the dumping mechanism will be simultaneously operated when actuating the driving mechanism of the corn popping machine.

A further object of the invention is the provision of an attachment of this character which can be installed on practically any form of corn popping machine employing independent dumping means for emptying the unpopped corn, without necessitating alterations or changes in the construction of the corn popping machine.

A still further object of the invention is the provision of an attachment of this character, which is comparatively simple in construction, readily and easily applied to and removed from a corn popping machine, thoroughly reliable and efficient in its operation, and inexpensive to manufacture and install.

The improvements in the details and arrangements of parts will be apparent from an inspection of the accompanying drawings, in connection with the specific description hereinafter contained, and wherein the preferred embodiment of the invention is disclosed for the purpose of imparting a full understanding of the improvements.

In the drawings:

Fig. 2 is a fragmentary top plan view showing a portion of the rotary corn popping cylinder of the machine.

Fig. 3 is a fragmentary detail perspective view of certain parts of the dumping attachment.

Fig. 4 is a fragmentary elevation partly in section showing in detail the pivotal connection of the attachment.

Similar reference characters indicate corresponding parts throughout the several views in the drawings.

Figure 1:
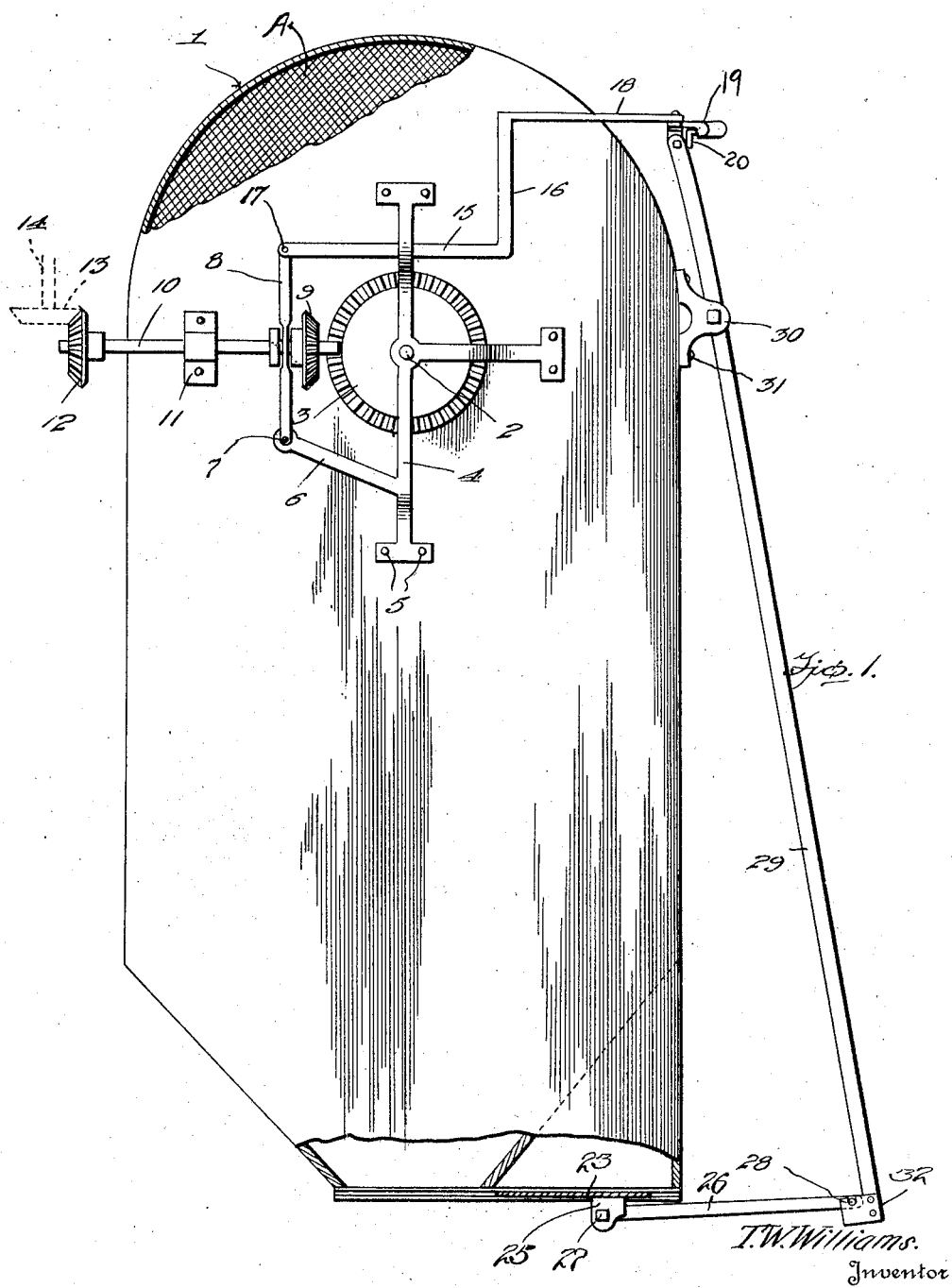
Figure 1 is an end elevation of a corn popping machine with the upper portion of the casing partly broken away, showing in detail the driving mechanism and shift lever therefor with the attachment constructed in accordance with the invention applied, the driving mechanism being in inoperative position, while the dumping attachment is in open position.

Referring more particularly to the drawings in detail, wherein like reference numerals refer to the corresponding parts I have shown for the purpose of illustration the improved dumping attachment as applied to the driving mechanism of a conventional form of corn popping machine, the casing of the latter being indicated in its entirety by the numeral 1 and this casing at its lower end terminates in a discharge hopper as usual. Mounted transversely of the casing is the usual driven shaft 2 which is journaled in said casing in any suitable manner and has fixed thereon exteriorly of said casing a beveled gear 3, which latter is adapted to receive motion from the driving connection hereinafter fully described. The shaft 2 has fixed or otherwise connected thereto interiorly of the casing 1 a rotary corn popping cylinder A, the same being of any ordinary well known construction. For rigidly supporting the gear 3, that is, to prevent undue movement of the same, a bracket arm 4 is engaged with the casing 1 as at 5 and has formed thereon a suitable bearing through which the adjacent extremity of the shaft 2 is disposed.

With a view toward providing the necessary means whereby power may be transmitted to the gear 3 and the corn popping cylinder A, there is provided upon the lower portion of the bracket arm 4 an upwardly extending arm 6 which latter is disposed preferably at an angle to the arm 4 and has pivotally connected as at 7 thereto a link 8, which is loosely connected through the medium of an annular looped portion intermediate its ends with the collar of a sliding gear 9 adapted for engagement with the gear 3, the gear 9 being splined or otherwise slidably mounted upon a stub shaft 10 supported in a bearing 11 secured to the adjacent wall of the casing of the corn popping machine. Stub shaft 10 has fixed to its outer end a beveled gear 12 in mesh with a similar gear 13 carried upon a driving shaft 14 which is operated from any suitable source of power.

The link 8 has pivotally connected thereto an angle arm 15 which has one extremity thereof extended beyond the casing 1 of the corn popping machine and this extremity is pivotally connected to a hand operable lever 19 which is pivotally supported in any suitable manner in a bearing bracket 20 carried upon a suitable hanger or support 21 located adjacent to the casing 1 of the corn popping machine.

The hand operable lever 19 has formed therein a slot 22 for receiving the pivotal connection between it and the said arm 18 so as to permit the rocking of the lever 19 for imparting movement to the arm 15. On actuating the hand lever 19 in one direction the gear 9 will be shifted into meshing engagement with the gear 3 and on reverse movement of said lever 19 the gear 9 will be thrown out of engagement with said gear 3, thus in this manner controlling the operation of the corn popping machine.

The dumping attachment comprises a movable gate or slide 23 which is adapted to open and close the discharge end of the lower hopper portion of the casing 1 and the same is movably supported in suitable channel ways 24 formed on the lower open end of the casing 1 at opposite sides of the discharge opening therein. Connected to the gate or slide 23 is a bracket 25 in which is detachably pivoted a link 26, the pivot 27 being passed transversely through the bracket 25 and said link 26. As will be noted, the link 26 extends for a distance slightly beyond the casing 1 and carries upon the outer end portion a cross pin 28, said pin being adapted to be received in a suitable socket or seat formed at the lower end of a lever 29 which is pivotally supported in a bracket 30 secured to the casing 1 as at 31, the seat or socket being formed in the block 32 carried at the lower end of said lever.

The seat or socket for the cross pin 28 of the link 26 is formed in the block 32 by the pockets or notches 33 on opposite sides of a recess or way 34 into which the outer end of the link 26 is received, thus, permitting the cross pin 28 to be readily engaged in said seat or socket with resultant positive connection of the link 26 with the lever 29.

The upper extremity of the lever 29 is preferably offset and is pivotally connected to the hand operable lever 19 at a point adjacent to the connection or at the point of connection of the arm 15 with said lever 19 and this connection is afforded through the medium of the angular piece 35, the latter being bolted or otherwise secured and has the pivotal connection 36 with said lever 29.

In operation of the corn popping machine the attendant or operator thereof when desiring to interrupt the motion of the cylinder A of said machine the hand operable lever 19 is shifted in a direction to cause the disengagement of the gear 9 from the gear 3 thereby rendering the driving mechanism of said machine inactive. On the shifting of the hand operable lever 19 the lever 29 will be rocked on the pivot 30 and by this movement the link 26 will shift the gate or slide 23 to open position relative to the discharge end of the hopper portion of the casing 1, thereby permitting the discharge of the contents of said hopper portion, thus permitting the unpopped corn which drops from the corn popping cylinder interiorly of the machine to be delivered from the casing 1 thereof.

When it is desired to operate the corn popping machine the hand operable lever is actuated in a direction to shift the gear 9 into mesh with the gear 3 so that the driving mechanism is active for actuating the corn popping cylinder interiorly of the casing 1 of the machine. On the meshing of the gear 9 with the gear 3 by actuating the lever 19 the lever 29 is moved and through the medium of the link 26 the gate or slide 23 is shifted to closed position relative to the open end of the casing 1 at the lower hopper portion thereof to close said opening and thereby prevent the discharge of contents from said casing during the operation of the corn popping machine.

I claim:

1. The combination with a corn popping machine having a casing and a rotary cylinder therein, said casing having a discharge-way formed in its bottom, of driving means for the cylinder, a valve for said discharge-way, a control means arranged on said casing and connected to the driving means for governing the transmission of motion to the cylinder, and means connected to said control means and the valve for the discharge-way to open and close said valve.

2. The combination with a corn popping machine having a casing and rotary cylinder therein, of gearing for imparting rotation to the rotary cylinder, a first lever mounted on the casing and connected to said gearing for engaging and disengaging the same, said casing having a discharge-way formed in its bottom, a slidable valve for normally closing said way, a second lever mounted on the casing and pivotally engaged with said first lever, and a link pivotally connected to said valve and detachably engaged with the second lever.

3. In a corn popping machine, a casing, a rotary corn popping cylinder within the casing, driving gear mechanism connected with the cylinder, a gear shifting means connected with the driving gear mechanism, a slide valve mounted in said casing at the bottom thereof, means for opening and closing the valve, and means for simultaneously operating the gear shifting means, and the valve opening and closing means.

In testimony whereof I affix my signature hereto.

THOMAS W. WILLIAMS.